(12) United States Patent
Kwon

(10) Patent No.: US 8,269,732 B2
(45) Date of Patent: Sep. 18, 2012

(54) PORTABLE TERMINAL

(75) Inventor: Sung-Min Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 694 days.

(21) Appl. No.: 12/395,172

(22) Filed: Feb. 27, 2009

(65) Prior Publication Data
US 2009/0219259 A1    Sep. 3, 2009

(30) Foreign Application Priority Data

Feb. 29, 2008 (KR) .................. 10-2008-0019335
Apr. 7, 2008 (KR) .................. 10-2008-0032364

(51) Int. Cl.
*G06F 3/041* (2006.01)
(52) U.S. Cl. .................. 345/173; 455/566; 428/1.1
(58) Field of Classification Search .................. 345/173; 455/566; 428/1.1
See application file for complete search history.

(56) References Cited

U.S. PATENT DOCUMENTS

| | | | |
|---|---|---|---|
| 6,721,651 B1* | 4/2004 | Minelli | 701/200 |
| 7,116,059 B2* | 10/2006 | Hori et al. | 315/169.3 |
| 7,148,439 B2* | 12/2006 | Nashiki et al. | 200/512 |
| 2002/0100677 A1* | 8/2002 | Fukui et al. | 200/512 |
| 2002/0101410 A1* | 8/2002 | Sakata et al. | 345/173 |
| 2004/0012570 A1* | 1/2004 | Cross et al. | 345/173 |
| 2006/0087479 A1* | 4/2006 | Sakurai et al. | 345/48 |
| 2006/0209045 A1* | 9/2006 | Su et al. | 345/173 |
| 2007/0070047 A1* | 3/2007 | Jeon et al. | 345/173 |
| 2007/0252825 A1* | 11/2007 | Nashiki et al. | 345/173 |

* cited by examiner

*Primary Examiner* — Wayne Young
*Assistant Examiner* — Linh Hoffner
(74) *Attorney, Agent, or Firm* — Birch, Stewart, Kolasch & Birch, LLP

(57) ABSTRACT

A portable terminal having a display, and a touch panel disposed on the display and configured to detect a touch input is provided. The touch panel includes a first transparent film having an upper surface and a lower surface, a first transparent electrode layer at the upper surface of the first transparent film, a second transparent film having an upper surface and a lower surface, a second transparent electrode layer at the lower surface of the second transparent film, the second transparent film being configured to overlap the first transparent film with a gap therebetween such that the first transparent electrode layer and the second transparent electrode layer face each other, and a deformable optical layer filling the gap between the first transparent film and the second transparent film.

22 Claims, 8 Drawing Sheets

| LAYERS | REFRACTIVITY |
|---|---|
| PROTECTIVE LAYER | 1.6 |
| ADHESIVE | 1.5 |
| SECOND TRANSPARENT FILM | 1.6 |
| SECOND ELECTRODE LAYER | 2.0 |
| DEFORMABLE OPTICAL LAYER | 1.6 |
| FIRST ELECTRODE LAYER | 2.0 |
| FIRST TRANSPARENT FILM | 1.6 |
| ADHESIVE | 1.5 |
| BASE MEMBER | 1.6 |

PORTABLE TERMINAL

CROSS-REFERENCE TO RELATED APPLICATIONS

The present application claims priority to Korean Applications No. 10-2008-0019335 filed on Feb. 29, 2008, and No. 10-2008-0032364 filed on Apr. 7, 2008, the entire contents of which are hereby incorporated by reference in their entireties.

BACKGROUND OF THE INVENTION

1. Field of the Invention

The present invention relates to a portable terminal with a touch panel capable of allowing a touch input on a display.

2. Description of Related Art

Portable terminals are easily carried by a user and generally provide one or more functions, such as, for example, supporting voice calls and telephony calls, inputting and/or outputting information, storing data, and the like. As the portable terminal becomes multifunctional, it can be configured to capture still images or moving images, play music or video files, play games, receive broadcasts, and the like, and, as such, may be implemented as an integrated multimedia player.

Over time, various hardware or software configurations have been implemented to provide these various functions and to support operations of components of the portable terminal. For example, in terms of its use, research continues in developing a user interface environment that allows a user to operate the portable terminal more easily and conveniently.

To this end, the portable terminal may be provided with a touch panel so as to allow an immediate input or operation of items or functions outputted or selected on a display. Users may often view a small display of the portable terminal while it is sunny outside or other bright light conditions rather than in a dark place. However, because most portable terminals are configured so that light is transmitted through several layers of the touch panel before reaching the display, and because each layer has a different refractivity, the visibility of the display may be lowered due to reflection of light at a boundary surface.

BRIEF SUMMARY OF THE INVENTION

Therefore, an object of the present invention is to enhance visibility of a display by minimizing a reflectivity of light at a boundary surface while the light is transmitted through a touch panel.

Another object of the present invention is to minimize an external impact applied to a display by closely adhering a touch panel to a display for reducing a reflection at a boundary surface.

To achieve these and other advantages and in accordance with the purpose of the present invention, as embodied and broadly described herein, there is provided a portable terminal having a display, and a touch panel disposed on the display and configured to detect a touch input. The touch panel includes a first transparent film having an upper surface and a lower surface, a first transparent electrode layer at the upper surface of the first transparent film, the first transparent electrode layer having a first refractivity, a second transparent film having an upper surface and a lower surface, a second transparent electrode layer at the lower surface of the second transparent film, the second transparent electrode layer having a second refractivity, the second transparent film being configured to overlap the first transparent film with a gap therebetween such that the first transparent electrode layer and the second transparent electrode layer face each other, and a deformable optical layer filling the gap between the first transparent film and the second transparent film, the deformable optical layer being configured to reduce the difference between the first refractivity of the first transparent electrode layer and a refractivity of the gap and to reduce the difference between the second refractivity of the second transparent electrode layer and the refractivity of the gap.

In accordance with another embodiment of the present invention, there is provided a portable terminal having a display, a touch panel, and an adhesive layer disposed between the display and the touch panel. The touch panel includes a first transparent film having an upper surface and a lower surface, a first transparent electrode layer at the upper surface of the first transparent film, a second transparent film having an upper surface and a lower surface, the second transparent film being spaced from the first transparent film to provide a gap therebetween, a second transparent electrode layer at the lower surface of the second transparent film, and a deformable optical layer filling the gap between the first transparent film and the second transparent film.

In accordance with yet another embodiment of the present invention, there is provided a portable terminal having a terminal body that includes a front surface, a display located in the terminal body, the display having an upper surface and a lower surface, a touch panel disposed above the display, the touch panel having an upper surface and a lower surface, an adhesive layer disposed between the upper surface of the display and the lower surface of the touch panel, and a damping member disposed between the lower surface of the display and an inner surface of the terminal body, the damping member being configured to absorb force applied to the display through user contact with the touch panel.

In accordance with still another embodiment of the present invention, there is provided a portable terminal having a display and a touch panel disposed on the display and being configured to detect a touch input. The touch panel including a first transparent film having an upper surface and a lower surface, a first transparent electrode layer at the upper surface of the first transparent film, a second transparent film having an upper surface and a lower surface, a second transparent electrode layer at the lower surface of the second transparent film, the second transparent film being configured to overlap the first transparent film with a gap therebetween such that the first transparent electrode layer and the second transparent electrode layer face each other, and a deformable optical layer filling the gap between the first transparent film and the second transparent film, the deformable optical layer being formed of a material that is different than the material of the first and second transparent electrode layers.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Description will now be given in detail of a portable terminal according to the present invention, with reference to the accompanying drawings.

Figure 1:
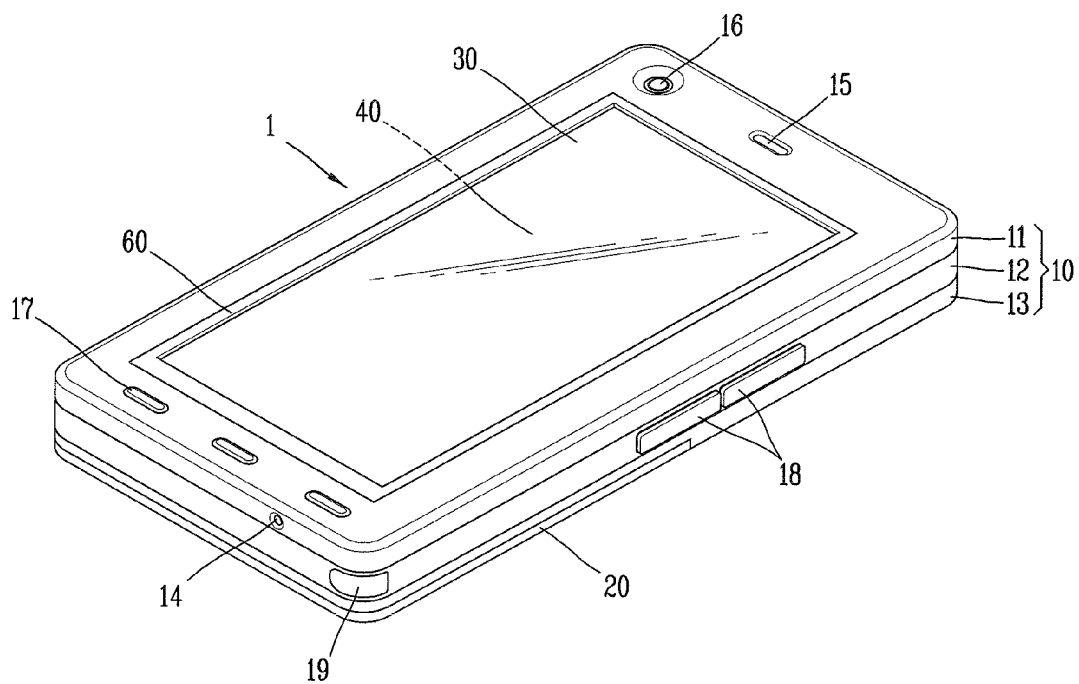
FIG. 1 is a perspective view of an upper surface of a portable terminal in accordance with an exemplary embodiment of the present invention.

As shown in FIG. 1, a portable terminal 1 may include a bar type terminal body 10. The terminal body 10 may include one or more casings, such as, for example an upper case 11, an intermediate case 12, and a lower case 13. The upper, intermediate, and lower cases 11, 12, and 13 are configured to provide an outer appearance of the portable terminal 1. The type of terminal body 10 may not be limited to the example shown in FIG. 1, but be applicable to other types of terminal bodies including a slide type, a folder type and other various types. The upper, intermediate, and lower cases 11, 12 and 13 may be formed by injecting a synthetic resin or formed of a metallic material, e.g., stainless steel (STS) or titanium (Ti).

A touch panel 30, an audio output unit 15, a first video input unit 16, and a first manipulation unit 17 may be disposed on an upper surface of the terminal body 10.

The touch panel 30 is configured to detect a touch input such that when a touch is detected on any portion of the touch panel 30, a content corresponding to the touched portion is inputted. Such contents inputted through the touch panel 30 may be characters, numerals, or menu items that are dependent on the operation mode of the portable terminal 1. The touch panel 30 may be transparent such that an internal display 40 can be viewed, and, as will be described later, include a structure to enhance visibility of the display 40.

The display 40 may visibly display information, and may be a liquid crystal display (LCD) module, an organic light emitting diode (OLED), a transparent OLED (TOLED), an e-paper, or the like. The display 40 and the touch panel 30 may be sized to occupy most or the entire entire surface of the terminal body 10.

The audio output unit 15 may be implemented as a receiver or a speaker. The first video input unit 16 may be implemented as a camera for allowing a user to capture images or video.

The first manipulation unit (or user interface) 17 may be implemented as a dedicated input device which is distinguished from the touch panel 30. The first manipulation unit 17 may be implemented as a key or button operated in a pushing manner or implemented in a touch-detecting manner.

A second manipulation unit 18 and an audio input unit 14 may be disposed at a side surface of the terminal body 10.

The first and second manipulation units 18 may be referred to as a manipulation portion. Such manipulation portion can employ any tactile manner that a user can touch or tap for manipulation. For instance, the manipulation portion may be implemented as a dome switch, a touch screen, a touch pad or the like by which a user can input commands or information in a pushing or touching manner. Alternatively, the manipulation unit may be implemented as a wheel or a jog which rotates keys or a joystick. The touch panel 30 may also be considered to be a manipulation unit, and as such, may also be part of the manipulation portion.

From a functional perspective, the first manipulation unit 17 may be configured to input commands such as START, END, SCROLL, or the like, and the second manipulation unit 18 may be configured as a hot-key for specific functions, such as controlling adjustable status levels (e.g., volume, brightness, retrieval of menus, and the like.), activating the first video input unit 16, or the like.

The audio input unit 14 may be implemented, for example, as a microphone through which a user's voice or other sounds can be input.

A broadcast signal receiving antenna 19 may be disposed at one side of the terminal body 10. The antenna 19 may be configured to be extendable from the terminal body 10 so as to ensure a sufficient length to be suitable for a dynamic range, or mounted inside the terminal body 10.

Figure 2:
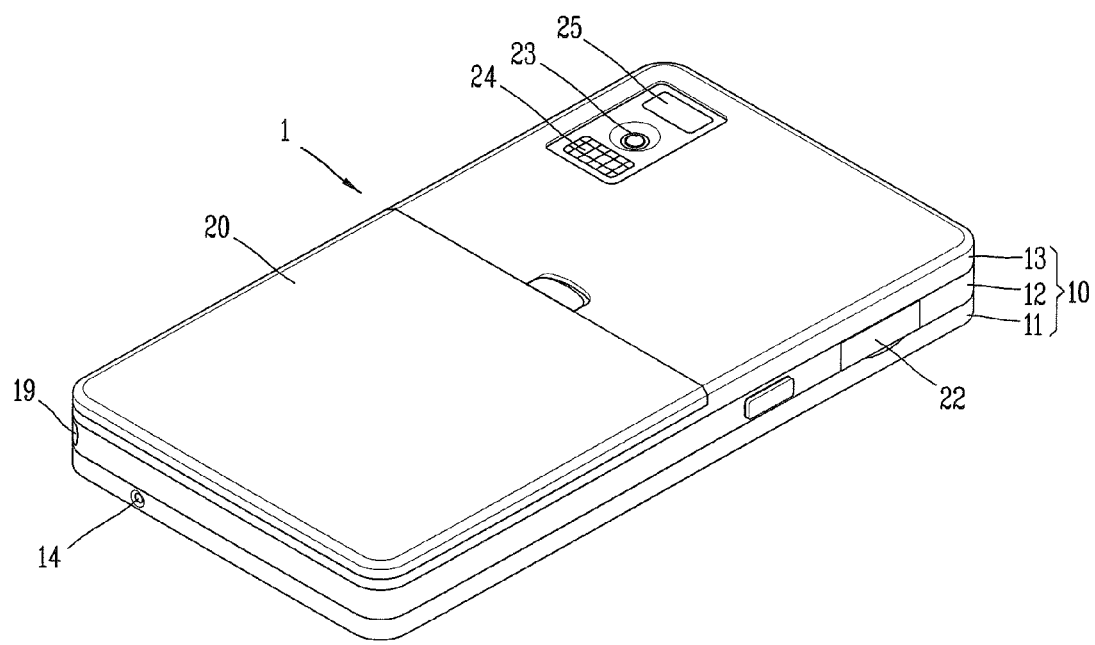
FIG. 2 is a perspective view of a lower surface of the portable terminal shown in FIG. 1.

As shown in FIG. 2, a second video input unit 23 may further be mounted at a lower surface of the terminal body 10. The second video input unit 23 may face a direction that is substantially opposite to a direction faced by the first video input unit 16. Also, the second video input unit 23 may be a camera having a different pixel size from those of the first video input unit 16. For example, the first video input unit 16 may operate with relatively lower pixels (lower resolution). Thus, the first video input unit 16 may be useful when a user can capture his face and send it to another party during a video call or the like. On the other hand, the second video input unit 23 may operate with relatively higher pixels (higher resolution) such that it can be useful for a user to obtain higher quality pictures for later use.

A flash 24 and a mirror 25 may be disposed adjacent to the second video input unit 23. The flash 24 operates in conjunction with the second video input unit 23 when taking a picture using the second video input unit 23. The mirror 25 can cooperate with the second video input unit 23 to allow a user to photograph himself in a self-portrait mode.

An external interface 22 may be disposed at a side surface of the terminal body 10. The external interface 22 may interface the portable terminal 1 and external devices so as to allow data exchange therebetween or the like. For example, the external interface 22 may be at least one of a wired/wireless access terminal for earphones, a short-range communication port (e.g., IrDA port, BLUETOOTH port, wireless LAN port, and the like), and power supply terminals for supplying power to the portable terminal. The external interface 22 may be a card socket for accommodating external cards such as Subscriber Identification Module (SIM), User Identity Module (UIM), memory card for storing information, or the like.

A second audio output unit (not shown) may further be provided at the lower case 13. Such audio output unit can cooperate with the first audio output unit 15 disposed at the upper case 11 to provide stereo output. Also, the audio output unit may be configured to operate as a speakerphone.

A power supplying unit 20 is provided at a rear surface of the portable terminal 1 to provide power required by the various components for the portable terminal 1. The provided power may be internal power, external power, or combinations thereof.

Figure 3:
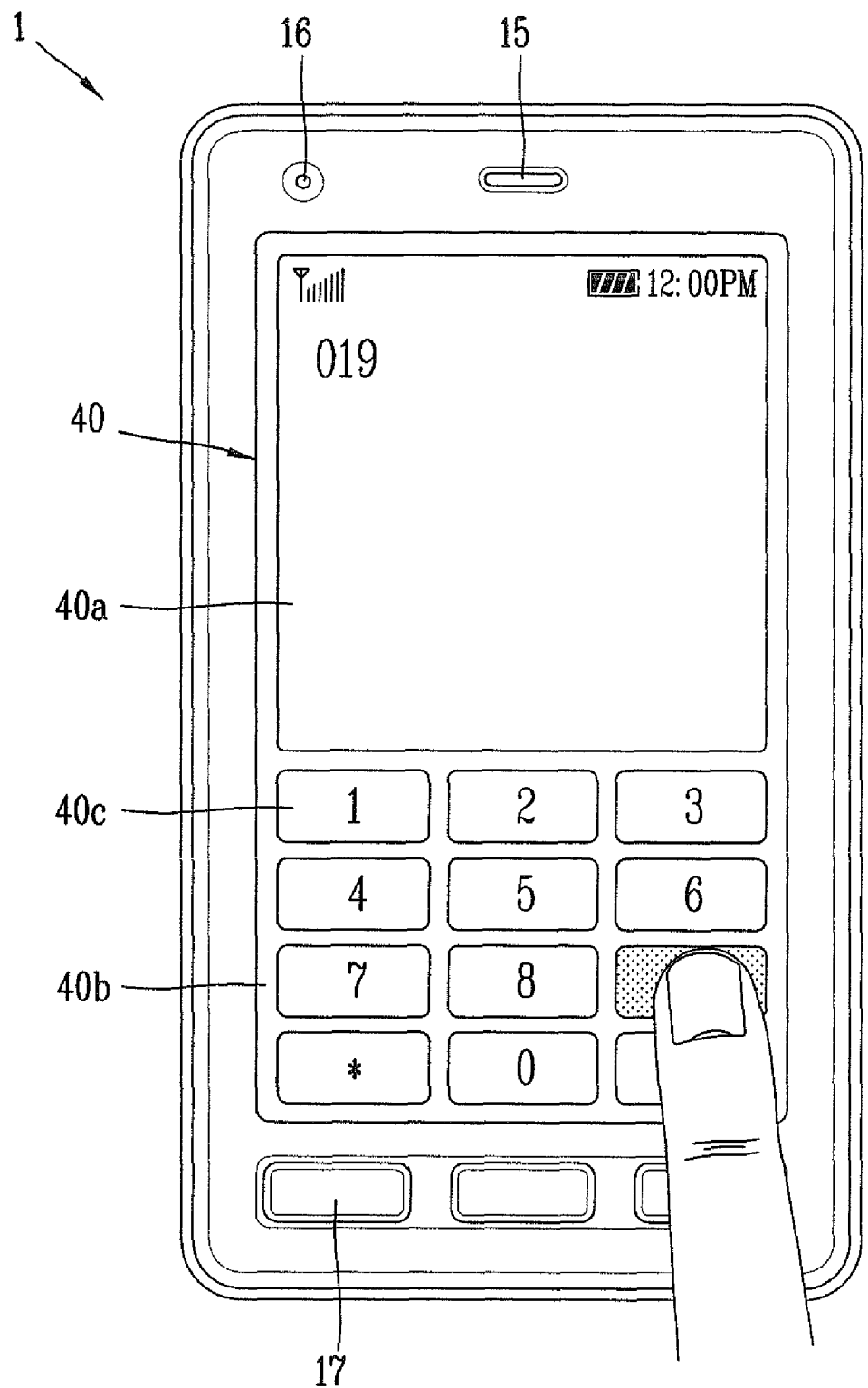
FIG. 3 is a plane view showing an operational state of a portable terminal according to the present invention.

As shown in FIG. 3, various types of visible information may be displayed on the display 40. Such information may be displayed in the form of characters, numerals, symbols, graphics or icons. For inputting such information, at least one of character, numeral, symbol, graphic or icon may be displayed in a certain arrangement, so as to be implemented as a type of a keypad. Such keypad may be referred to as a so-called 'soft key'. The display 40 may be operated as an entire area, or operated by being divided into a plurality of regions. For the latter, the plurality of regions may be operated in cooperation with each other. For example, the display 40 is provided with an output window 40a and an input window 40b. The output and input windows 40a and 40b are regions allocated for output and input of information, respectively. The input window 40b outputs soft keys 40c having numerals thereon for inputting telephone numbers, for example. Upon touching one of the soft keys 40c, a numeral or the like corresponding to the touched soft key 40c is displayed on the output window 40a. Upon manipulating the first manipulation unit 17, a call connection for the telephone number displayed on the output window 40a is attempted.

In addition to the above input method, the touch panel 30 may be configured to receive information or the like in a scrolling manner. A user may scroll the display 40 or the touch panel 30, thus to move a cursor or pointer located on an object, e.g., an icon, displayed on the display 40. In addition, upon moving a finger on the touch panel 30, a path corresponding to the movement of the finger may visually be displayed on the display 40. This configuration may be useful upon editing an image displayed on the display 40.

The touch panel 30 may be configures such that when the touch panel 30 is simultaneously touched at several portions within a certain time period, one function of a terminal may be executed. An example of the simultaneous touching may include a situation where a user clamps a terminal body using his thumb and index finger. An example of a function implemented by simultaneous touching may include activating or deactivating the touch panel 30.

As described above, the display 40 and the touch panel 30 are disposed at the upper surface of the terminal body 10. However, it is also understood that the display 40 and the touch panel 30 may be disposed at a lower surface of the terminal body. In this case, the terminal body may be formed to be transparent.

Figure 4:
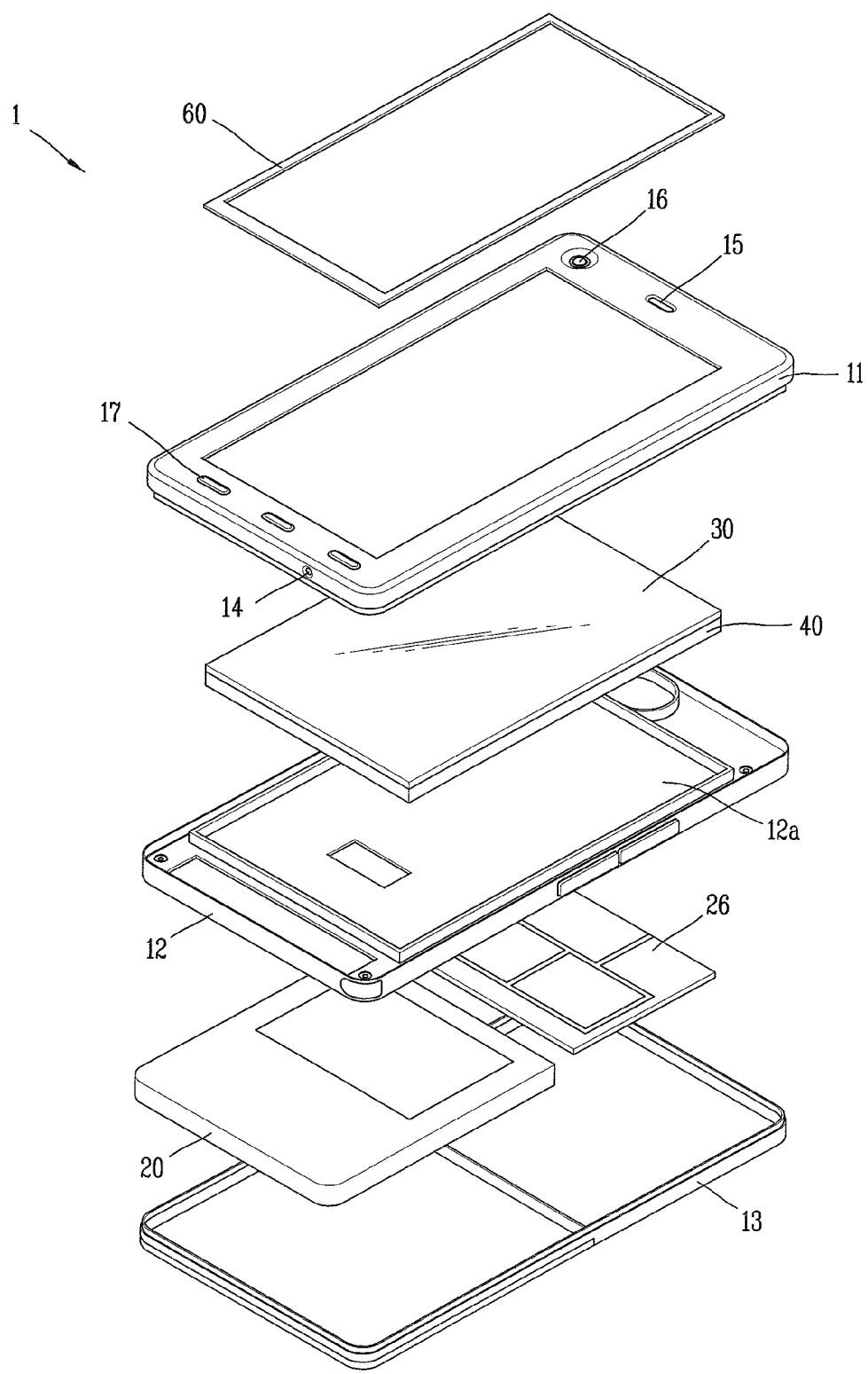
FIG. 4 is an exploded perspective view of the portable terminal shown in FIG. 1.

As shown in FIG. 4, an intermediate case 12 for supporting components may be provided between the upper case 11 and the lower case 13. A mounting portion 12a for supporting the display 40 is formed at an upper installation surface of the intermediate case 12. A circuit board 26 may be disposed between the intermediate case 12 and the lower case 13. The touch panel 30 and the display 40 may be disposed to be spaced apart from each other, or integrally formed with each other by adhesion. For the latter, a shield member 60 for effectively shielding a clearance, which may be generated by a longitudinal movement of the touch panel 30 due to a touch operation or an impact, may be disposed on an edge of an upper surface of the touch panel 30.

Figures 5, 6:
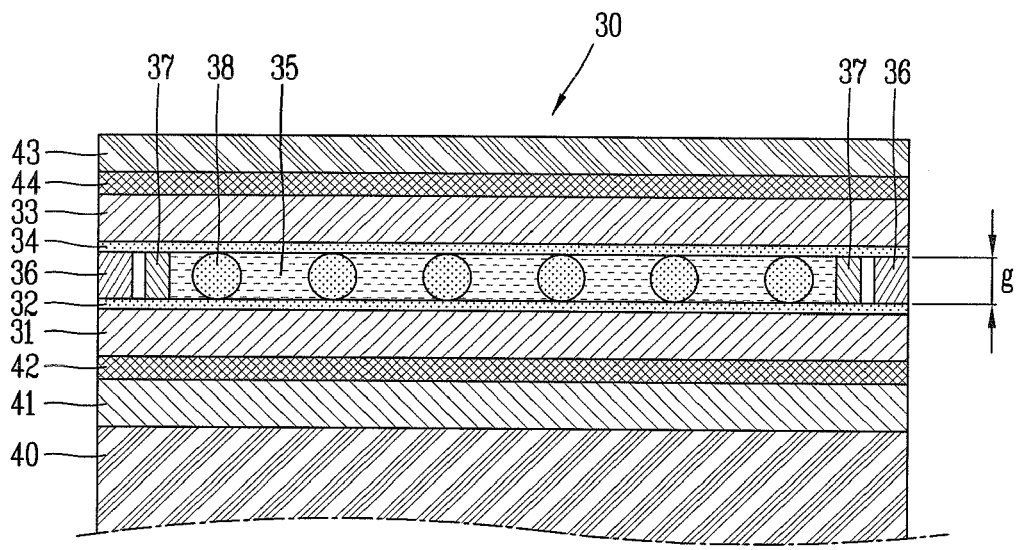
FIG. 5 is a cross-sectional view of a touch panel according to the present invention.
FIG. 6 is an exemplary table showing a refractivity of each layer configuring a touch panel in accordance with an exemplary embodiment of the present invention.

As shown in FIG. 5, the touch panel 30 may include a base 41, a first transparent film 31, a first electrode layer 32, a deformable optical layer 35, a second electrode layer 34, a second transparent film 33, and a protective layer 43, which may take the form of a window at the surface of the terminal body. The base 41 may be implemented so as to support the first and second transparent films 31 and 33, and be formed of transparent resins or ceramics, such as glass, for tolerating pressure or impact applied to the protective layer 43.

Each of the first and second transparent films 31 and 33 is a member that supports the first and second electrode layers 32 and 34, respectively. For example, the material for the first and second transparent films 31 and 33 may be polyethylene terephthalate (PET) having a refractivity of about 1.6, polymethylmethacrylate (PMMA) having a refractivity of about 1.5, or the like.

The first electrode layer 32 is transparently formed at the upper surface of the first transparent film 31, and the second electrode layer 34 is transparently formed at the lower surface of the second transparent film 33. The first and second transparent films 31 and 33 are spaced apart from each other with a certain gap "g". Spacers 38 are sporadically disposed for maintaining the gap "g". The spacer 38 may be formed in the shape of a ball, and implemented to be movable within the gap by a pressure applied to the protective layer 43.

The first and second electrode layers 32 and 34 may be patterned so as to detect touched positions on the touch panel 30. For example, the first electrode layer 32 may be configured in the form of a plurality of X-directional lines, whereas the second electrode layers 34 may be configured in the form of a plurality of Y-directional lines. The first and second electrode layers 32 and 34 may be configured by vacuum-depositing a material, such as Indium Tin Oxide (ITO), on the first and second transparent films 31 and 33, respectively.

The spaces between the first transparent film 31 and the base 41 and between the second transparent film 33 and the protective layer 43 are filled with adhesive members or adhesive tapes 42 and 44, respectively. Also, the base 41 and the display 40 may be bonded to each other by such adhesive member or adhesive tape.

The deformable optical layer 35 is filled in a gap between the first and second electrode layers 32 and 34, and reduces a difference of refractivity between the first electrode layer 32 and the gap and that between the second electrode layer 34 and the gap. The deformable optical layer 35 can reduce the difference of the refractivity between the first and second electrode layers 32 and 34, as compared to if the gap was filled only with air, thereby minimizing the decrease in visibility of the display 40 due to the touch panel 30.

A sealant 37 for sealing the deformable optical layer 35 may be provided at an edge or perimeter of the deformable optical layer 35. The sealant 37 may be formed in a printing manner. As one example, the sealant 37 may be formed by a seal printing process.

An outer side of the sealant 37 may further include an adhesive member or adhesive tape 36. Such adhesive member or adhesive tape 36 serves to prevent the leakage of the deformable optical layer 35 and also firmly maintain the gap between the first and second electrode layers 32 and 33.

In this exemplary embodiment, the first and second electrode layers 32 and 34 may have the same refractivity, and the deformable optical layer 35 filled in the gap "g" may be formed of liquid. Hence, a higher refractivity than air is provided, and as a result, the reflectivity of light is lowered at a boundary surface between the first electrode layer 32 and the deformable optical layer 35. This arrangement may similarly be applied to a boundary surface between the second electrode layer 34 and the deformable optical layer 35.

If first and second electrode layers having a refractivity of 1.8 or higher are used in conjunction with an air gap having a refractivity of 1.0, a difference of refractivity of about 0.8 is generated. This difference in refractivity can be reduced by providing the deformable optical layer 35 in the air gap in order to minimize the reflection of light at the boundary surface, which is a result of the difference of refractivity. If water, which has a refractivity of 1.33, is used as the deformable optical layer 35, the difference of refractivity can be reduced and also the reflection of light can be reduced at the boundary surface. Also, if the deformable optical layer 35 is a liquid, the deformable optical layer 35 has a greater capability of restoring the interval between the first and second electrode layers 32 and 34 as compared to the air gap, resulting in remedying a newtonain phenomenon (which denotes a phenomenon that an electrode layer and its adjacent electrode layer are stuck to each other giving the appearance of a stain on the touch panel), which may occur when the touch panel 30 is pressed by a user or object.

In order to further lower the reflection at the boundary surface, the difference of refractivity between the first and second electrodes layers 32 and 34 and the deformable optical layer 35 can be lowered below 0.5, so as to increase the transmittance of the touch panel 30. As one example, the first and second electrode layers 32 and 34 may be formed of Indium Tin Oxide (ITO) having a refractivity of 2, and the deformable optical layer 35 may be formed of liquid crystal having a refractivity of 1.6. Because the liquid crystal has a large specific resistance value, a leakage current between the first and second electrode layers 32 and 34 formed of the ITO is small, and accordingly a normal operation of the touch panel 30 may not be interrupted.

FIG. 6 is an exemplary table showing a refractivity of each layer configuring a touch panel in accordance with one exemplary embodiment of the present invention. If the gap between the first and second electrode layers 32 and 34 is filled with air, the air has a refractivity of 1. Accordingly, viewing the touch panel 30 in whole, the maximum difference of inter-layer refractivity is 1. On the other hand, when the deformable optical layer 35 is filled in the gap, as shown in FIG. 5, the maximum difference of the inter-layer refractivity is 0.4, which induces an increase in the transmittance of the touch panel 30.

Figure 7:
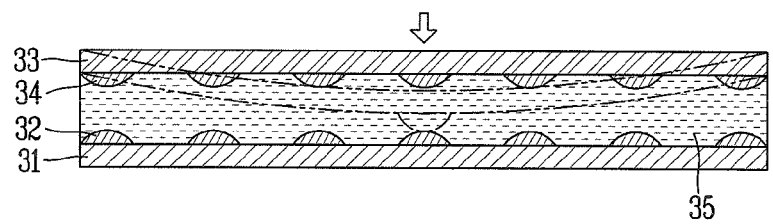
FIG. 7 is a cross-sectional schematic view of first and second electrode layers in accordance with an exemplary embodiment of the present invention.

As shown in FIG. 7, the first and second electrode layers 32 and 34 may respectively be formed in a manner of depositing a metal having conductivity. When a specific portion is touched and a pressure is thereby applied to the first transparent film 31, the first transparent film 31 is deformed at the touched portion and the first electrode layer 32 comes in contact with the second electrode layer 34 at that portion. Accordingly, the electric signal is recognized as a resistance value, resulting in the input of the corresponding content.

Protruded portions may be provided at the first and second electrode layers 32 and 34 in order to reduce a surface resistance upon touching the first and second electrode layers 32 and 34. That is, the shapes of the first and second electrode layers 32 and 34 are changed, in order for the first and second electrode layers 32 and 34 to be easily contacted (shorted) with each other with a lower resistance applied by the deformable optical layer 35 when a specific portion is touched to generate pressure. Therefore, a delay of response time can be minimized upon touching the touch panel 30.

Figure 8:
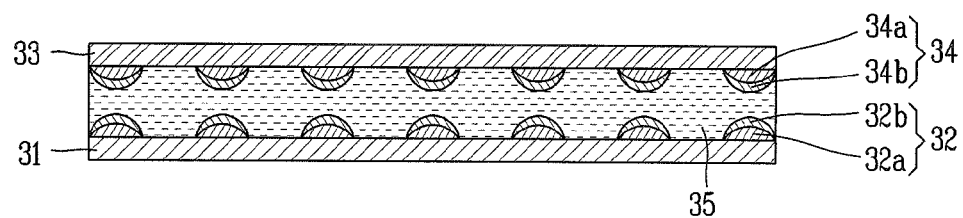
FIG. 8 is a cross-sectional schematic view of first and second electrode layers in accordance with another exemplary embodiment of the present invention.

As shown in FIG. 8, another exemplary arrangement of the first and second electrode layers 32 and 34 may be provided. Each of the first and second electrode layers 32 and 34 may be formed by depositing a conductive metal, such as ITO, several times, so as to build up a more corn-like shape. For example, the first electrode layer 32 may be provided by further depositing a second deposition layer 32b on a first deposition layer 32a having been previously formed. The second electrode layer 34 may be provided by further depositing a second deposition layer 34b on a first deposition layer 34a. As such, the first and second electrode layers 32 and 34 are configured to have corn-like shapes that protrude from the surfaces of the films 31 and 33. Accordingly, upon a touch input, the deformable optical layer 35 around the first and second electrode layers 32 and 34 is easily moved aside, which reduces a resistance due to the deformable optical layer 35 itself.

Figure 9:
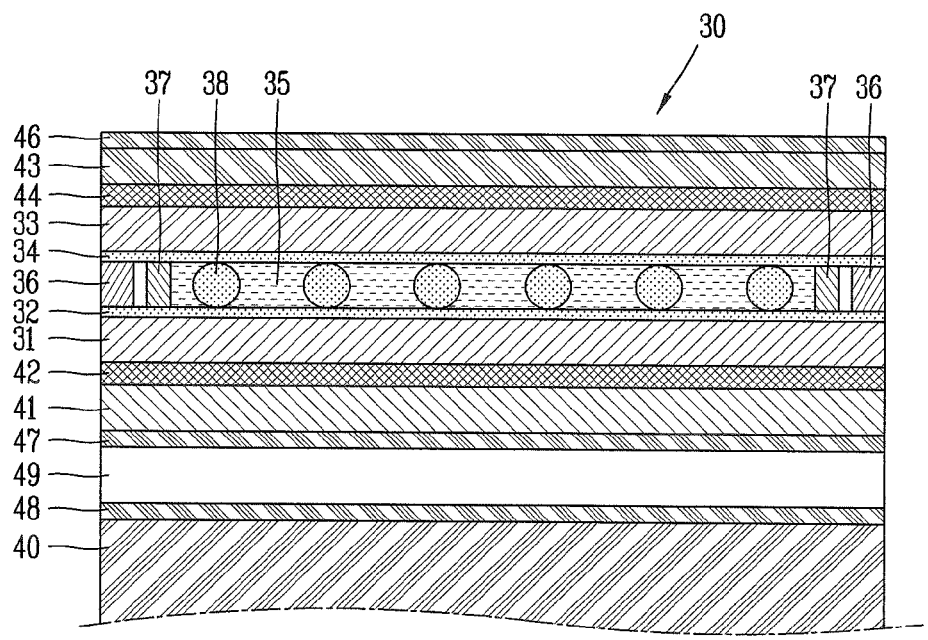
FIG. 9 is a cross-sectional view of a laminated configuration of a touch panel and display of a portable terminal in accordance with another exemplary embodiment of the present invention.

Having described an exemplary arrangement of a touch panel and display above, a second exemplary arrangement of a touch panel and display is shown in FIG. 9. In particular, an anti-reflection (AR) coating layer 46 is further formed at an upper surface of the touch panel 30 to reduce reflected light on the surface of the touch panel 30. In particular, on a protective layer 43, an amount (e.g., about 20%) of reflected light of incident light is considerable, which may cause a difficulty in recognizing an image on the display 40. The AR coating layer 46 can be used to reduce the amount of reflected light. Similarly, an AR coating layer 47 may further be formed at a lower surface of the touch panel 30 to reduce the degree of reflection of light transmitted through the touch panel 30 at the boundary surface. Also, an AR coating layer 48 may further be formed at an upper surface of the display 40, so as to reduce the reflectivity generated on the surface of the display 40. Such AR coating layers 46, 47 and 48 can minimize the reflection of incident light by destructive interference. FIG. 9 shows that the display 40 and the touch panel 30 are spaced apart by an air gap 49. However, the display 40 and the touch panel 30 may be stick together. In this case, the air gap 49 and the AR coating layers 47, 48 may be omitted.

Figure 10:
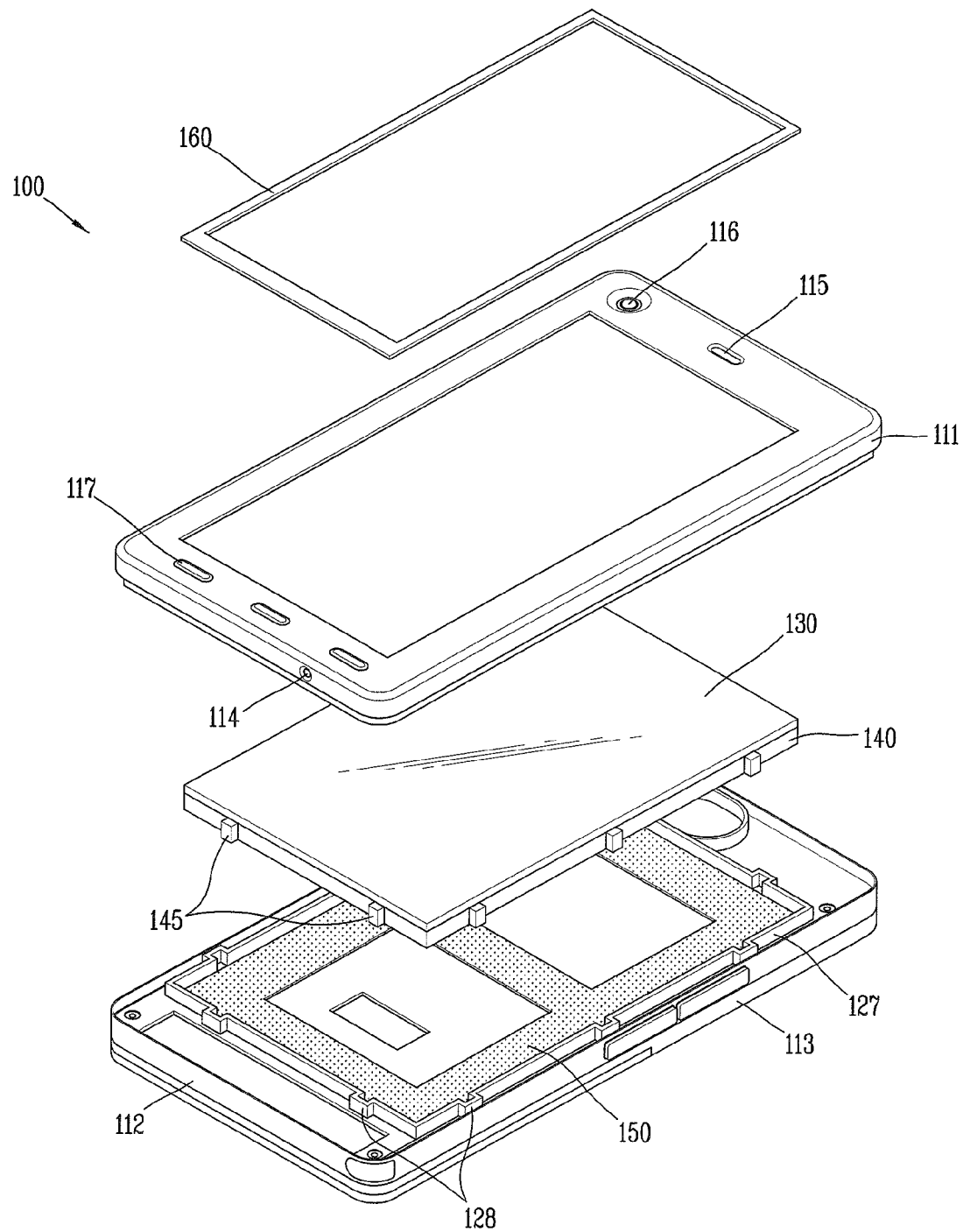
FIG. 10 is a exploded perspective view of a portable terminal according to an exemplary embodiment of the present invention.

Another exemplary embodiment of a portable terminal 100 is shown in FIG. 10. The portable terminal 100 is similar to the portable terminal 1 described above, but further includes a side wall 127 for supporting a display 140 formed at an upper installation surface of an intermediate case 112. A touch panel 130 and the display 140 may integrally be formed with each other in a bonding (adhering) manner. A shield member 160 may be disposed on an edge of an upper surface of the touch panel 130 so as to effectively shield a clearance generated due to a longitudinal movement of the touch panel 130 integrated with the display 140 by a touching operation or impact. The shield member 160 may be formed of rubber or plastic so as to decrease such impact.

Guide grooves 128 are formed in side wall 127 to allow vertical movements of the touch panel 130 and the display 140 integrated with the touch panel 130. Guide protrusions 145 are formed at the edge of the display 140 and are vertically movable within the guide grooves 128. Accordingly, displacement of the display 140 or the touch panel 130 is limited, thereby decreasing the possibility of damaging the display 140 or the touch panel 130 when the touch panel is used by a user or the touch panel receives an impact force.

Figure 11:
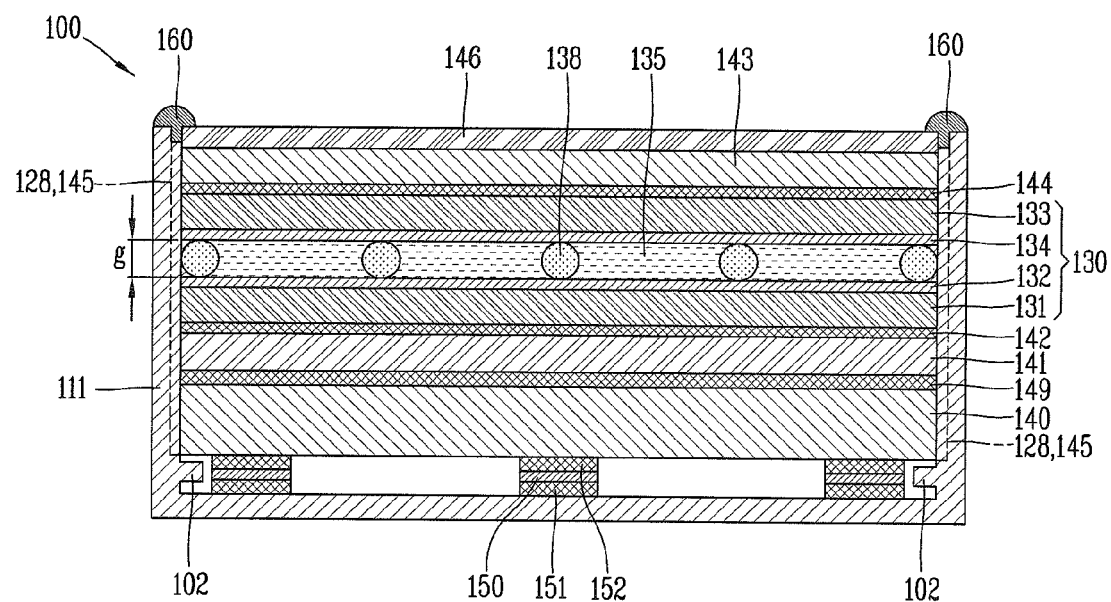
FIG. 11 is a cross-sectional view of the portable terminal shown in FIG. 10.

As shown in FIG. 11, the touch panel 130 includes a first transparent film 131 having a first electrode layer 132 transparently formed on its upper surface, and a second transparent film 133 having a second electrode layer 134 transparently formed on its lower surface and disposed above the first transparent film 131 such that the first and second electrode layers 132 and 134 face each other with a certain gap "g" between the first and second transparent films 131 and 133. The first and second electrode layers 132 and 134 may be patterned so as to detect touched positions. The first and second electrode layers 132 and 134 may be configured such that a material, such as ITO, is deposited on the first and second transparent films 131 and 133, respectively.

A transparent supporting base 141 is disposed below the touch panel 130, and the display 140 is disposed below the supporting base 141. Adhesive layers 142, 144 and 149 are located between the first transparent film 131 and the base 141, between the second transparent film 133 and the protective layer 143, and between the base 141 and the display 140, respectively.

Damping members 150 are disposed below the display 140 for damping an impact applied to the display 140 via its integration with the touch panel 130. The damping members 150 are adhered to terminal body 110 an adhesive layer 151, and also adhered to the display 140 by an adhesive layer 152. A stopper 102 for restricting an additional movement of the display 140 when the display 140 is moved down by a certain depth is also provided as part of the terminal body 110.

An anti-reflection (AR) coating layer 146 is further formed on the protective layer 143, so as to reduce reflected light on the surface of the touch panel 130.

The deformable optical layer 135 is filled in a gap between the first and second electrode layers 132 and 134, and reduces a difference of refractivity between the first electrode layer 132 and the gap and that between the second electrode layer 134 and the gap. The deformable optical layer 135 can reduce the difference of the refractivity between the first and second electrode layers 132 and 134, as compared to if the gap was filled only with air, thereby minimizing the decrease in visibility of the display 140 due to the touch panel 130.

A sealant (not shown in FIG. 11) similar to that shown in FIG. 9, may be provided at the edge of the deformable optical layer 135 to seal the deformable optical layer 135. The sealant may be formed by a seal printing process. An adhesive member or adhesive tape (not shown in FIG. 11) similar to that shown in FIG. 9 may be provided at an outer side of the sealant. Such adhesive member or adhesive tape can firmly maintain the gap between the first and second electrode layers 132 and 134 and prevent the leakage of the deformable optical layer 135.

The first and second electrode layers 132 and 134 may have the same refractivity, and the deformable optical layer 35 filled in the gap "g" is formed of liquid. Hence, a higher refractivity than air is provided, and as a result the reflectivity of light is lowered at a boundary surface between the first electrode layer 132 and the deformable optical layer 135. This arrangement may similarly be applied to a boundary surface between the second electrode layer 134 and the deformable optical layer 135.

Protruded portions may be provided at the first and second electrode layers 132 and 134 in order to reduce a surface resistance upon touching the first and second electrode layers 132 and 134. Each of the first and second electrode layers 132 and 134 may be formed by depositing a conductive metal, such as ITO, plural times, so as to have a more corn-like shape.

Figure 12:
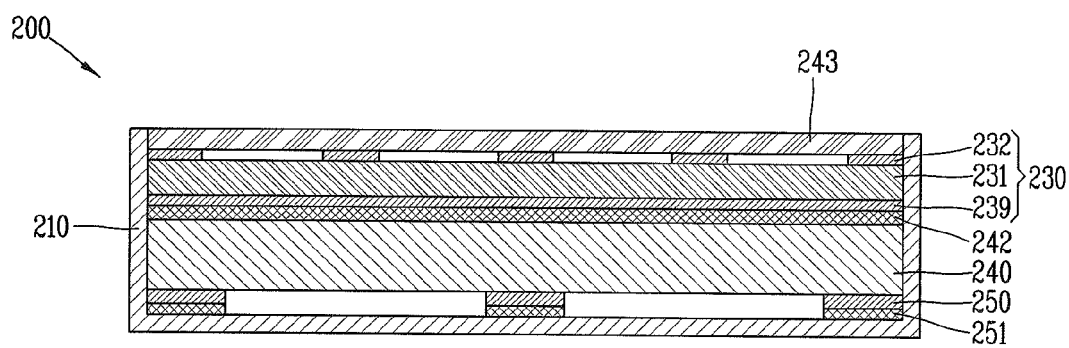
FIG. 12 is a cross-sectional view of a portable terminal according to an exemplary embodiment of the present invention.

As shown in FIG. 12, a portable terminal 200 according to another exemplary embodiment of the present invention may include a protective layer 243, a touch panel 230, a first adhesive layer 242, a display 240, damping members 250, and second adhesive layers 251.

In detail, the touch panel 230 includes a transparent glass 231. An electrode layer 232 is transparently formed on an upper surface of the glass 231, and a shield pattern 239 is transparently formed on a lower surface thereof. The electrode layer 232 includes a plurality of electrodes formed in a horizontal direction or a vertical direction. When the protective layer 243 is touched, the electrode layer 232 detects the change in capacitance at the corresponding portion and recognizes such change as an input signal.

The first adhesive layer 242 adheres the touch panel 230 to the display 240 in order to remove an air gap between the touch panel 230 and the display 240, thereby reducing a drastic change in the refractivity between the touch panel 230 and the display 240. That is, when an air gap having a relatively low refractivity exists between the touch panel 230 and the display 240, the refractivity may drastically be changed while light progresses from the touch panel 230 into the air gap and then progresses to the display 240. Accordingly, the air gap is substituted by the first adhesive layer 242 having a relatively high refractivity, thus to reduce a deviation of the refractivity between materials. As a result, the problem that the visibility of the display 240 is lowered when the surrounding of the portable terminal 200 is bright can be effectively decreased.

The display 240 is integrated with the touch panel 230 by means of the first adhesive layer 242 such that a directly applied external impact can be reduced by the damping members 250. That is, the damping members 250 disposed below the display 240 can prevent the breakdown of the display 240 when the touch panel 230 is touched or an impact is applied to the touch panel 230. The damping members 250 may be formed of porous resin or rubber or implemented as springs. As shown in FIG. 12, the damping members 250 are adhered to the terminal body 210 by the second adhesive layers 251, and also disposed to be directly contacted with the terminal body 210. The second adhesive layers 251 may be formed of resin with elasticity so as to provide a damping effect itself.

Figure 13:
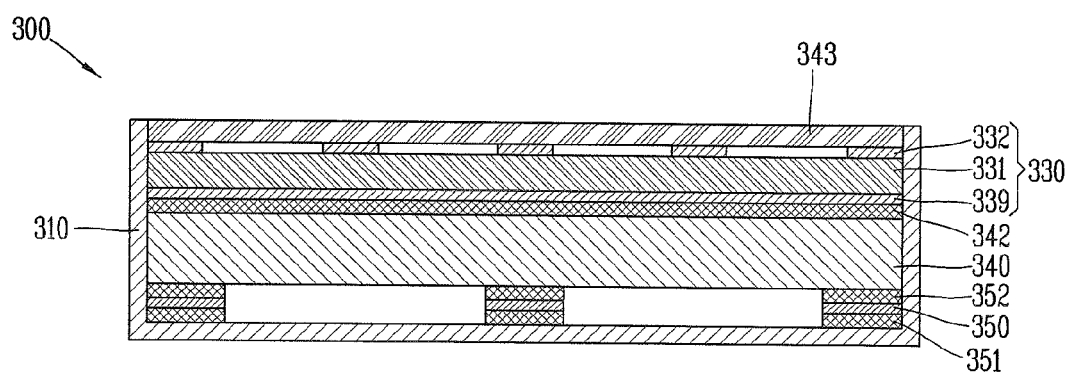
FIG. 13 is a cross-sectional view of a portable terminal according to an exemplary embodiment of the present invention.

As shown in FIG. 13, a portable terminal 300 according to another exemplary embodiment of the present invention may where touch panel 330 and a display 340 are adhered to each other by a first adhesive layer 342, as shown in the previous exemplary embodiment. Damping members 350 are adhered to a terminal body 310 by second adhesive layers 351, and also adhered to the display 340 by third adhered layers 352. Other configurations are similar to those in the previous embodiment, and the portable terminal 300 according to this exemplary embodiment can have features disclosed in the previous exemplary embodiment. The third adhesive layer 352 may be formed of resin having elasticity so as to provide a damping effect itself.

Figure 14:
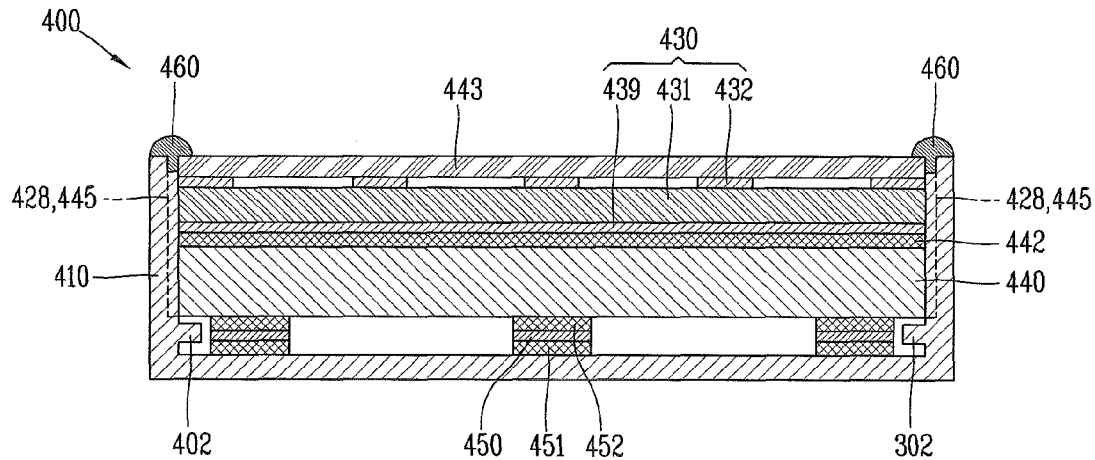
FIG. 14 is a cross-sectional view of a portable terminal according to an exemplary embodiment of the present invention.

As shown in FIG. 14, a portable terminal 400 according to another exemplary embodiment of the present invention may include guide grooves 428 and guide protrusions 445 to prevent damage of a display 440 upon a touch panel 430 being touched by providing a clearance between the touch panel 430 and a terminal body 410. Damping members 450 for damping an impact applied to the display 440 integrated with the touch panel 430 is provided below the display 440.

A shield member 460 for shielding the clearance between the touch panel 430 and the terminal body 410 upon the touch panel 430 being pressed may be disposed on an upper end of the edge of the terminal body 410. In addition, a stopper 402 for restricting an additional movement of the display 440 when the display 440 is moved down by a certain depth is formed below the display 440. Accordingly, the display 440 can be protected from an impact and also be restricted from an excessive movement, so as to prevent spoiling of the outer appearance of the portable terminal 400.

Figure 15:
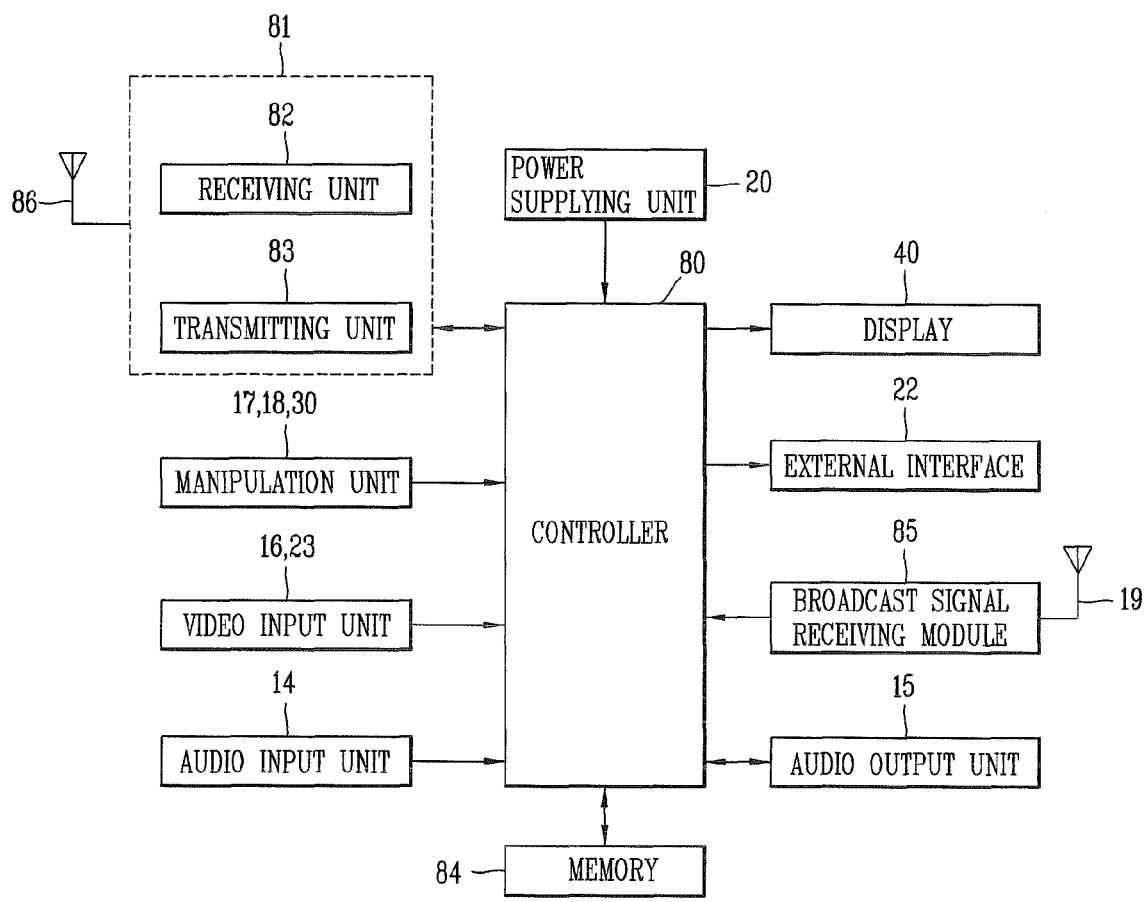
FIG. 15 is a block diagram of a portable terminal according to an exemplary embodiment of the present invention.

FIG. 15 is a block diagram of a portable terminal according to the present invention. A portable terminal according to any of the previous exemplary embodiments of the present invention may include a wireless communication module 81, manipulation units 17, 18 and 30 (touch panel), video input units 16 and 23, an audio input unit 14, a display 40, an audio output unit 15, an external interface 22, a broadcast signal receiving module 85, a memory 84, a power supplying unit 20, and a controller 80.

The controller 80 is typically configured to control an overall operation of the portable terminal. For example, the controller 80 may perform control and processing of voice communication, data communication, telephony communication and the like.

The wireless communication module 81 is configured to transmit/receive a wireless (radio) signal to/from a mobile communication base station via an antenna 86. For example, the wireless communication module 81 includes a transmitting unit 82 for handling transmission and reception of voice data, text data, video data, and control data under the control of the controller 80; modulating a signal to be sent for transmission; and a receiving unit 83 for demodulating a received signal.

The manipulation units 17, 18 and 30 are configured as shown in FIG. 1, so as to provide the controller 80 with data input by a user for controlling the operation of the terminal.

The video input units 16 and 23 are configured to process image frames, such as still images or video, obtained by an image sensor in a video call mode or capturing mode. The processed image frame is converted into image data displayable on the display 40 so as to be outputted to the display 40. The image frame processed by the image input units 16 and 23 are stored in a memory or transmitted to the exterior via the wireless communication module 81, under the control of the controller 80.

The audio input unit 14 is configured to receive an external audio signal via a microphone in a call communication mode, recording mode, voice recognition mode and the like, and to process the external audio signal into electric audio data. The processed audio data is converted into a format transmittable to the mobile communication base station via the wireless communication module 81 in the call communication mode, and outputted to the wireless communication module 81. Also, in the recording mode, the processed audio data is stored in the memory 84. The audio input unit 14 may include assorted noise removing algorithms to remove noise generated in the course of receiving the external audio signal.

The display 40 may display information processed in the portable terminal. For example, when the portable terminal is in a call communication mode, the display 40 displays a User Interface (UI) or a Graphic User Interface (GUI) related to the call under the control of the controller 80. When the portable terminal is in the video call mode or a capturing mode, the display 40 displays captured images or video using the UI or GUI under the control of the controller 80.

The audio output unit 15 may convert audio data received from the wireless communication module 81 or audio data stored in the memory 84 under the control of the controller 80 when the portable terminal is in the call-receiving mode, a call communication mode, a recording mode, a voice recognition mode, or a broadcast receiving mode. Such converted audio data is then outputted to the exterior. The audio output unit 15 also outputs an audio signal associated with a function (e.g., outputting a call receiving sound, a message receiving sound, or the like) performed by the portable terminal. Such audio output unit 15 may include a speaker, a receiver, a buzzer and the like.

The external interface 22 interfaces the portable terminal to all types of external devices, including wired/wireless headset, external charger, wired/wireless data port, card socket (e.g., memory card, SIM/UIM card, etc.) or the like. The external interface 22 is configured to allow the portable terminal to receive data or power from external devices and transfer such data or power to each component inside the portable terminal, or transmit internal data of the portable terminal to external devices.

The memory 84 may store a program for the control and processing of the controller 80, or temporarily store input/output data (e.g., phone book data, messages, still images, video or the like). The memory 84 may store various multimedia contents, system information, or programs under the control of the controller 80. The memory 84 may include typically known hard disk, a card-type memory (e.g., SD or XD memory), a flash memory, RAM, ROM, and the like.

The broadcast receiving module 85 may receive broadcast signals transmitted via satellites or terrestrial waves and convert such broadcasting signal into a broadcast data format capable of being outputted to the audio output unit 15 and the display 40 so as to output to the controller 80. The broadcast receiving module 85 may also receive additional data associated with broadcasting (e.g., Electric Program Guide (EPG), channel list, or the like). The broadcast data converted in the broadcast receiving module 85 and the additional data may be stored in the memory 84.

The power supplying unit 20 provides power required by the various components for the portable terminal. The provided power may be internal power, external power, or combinations thereof.

The portable terminal having described so far may not be limited to the configurations and methods of the described embodiments. However, all or part of the embodiments may selectively be combined so as to implement various modifications.

What is claimed is:

1. A portable terminal comprising:
   a display; and
   a touch panel disposed on the display and configured to detect a touch input, the touch panel including:
   a first transparent film having an upper surface and a lower surface;
   a first transparent electrode layer disposed at the upper surface of the first transparent film, the first transparent electrode layer having a first refractivity;
   a second transparent film having an upper surface and a lower surface;
   a second transparent electrode layer disposed at the lower surface of the second transparent film, the second transparent electrode layer having a second refractivity, the second transparent film being configured to overlap the first transparent film with a gap therebetween such that the first transparent electrode layer and the second transparent electrode layer face each other;
   a deformable optical layer having a refractivity higher than that of air, filling the gap completely between the first transparent film and the second transparent film, and contacting the first and second transparent electrode layers, the deformable optical layer being configured to reduce the difference between the first refractivity of the first transparent electrode layer and a refractivity of the gap and to reduce the difference between the second refractivity of the second transparent electrode layer and the refractivity of the gap; and protruded portions formed at the first transparent electrode layer and the second transparent electrode layer, respectively, such that the first and second transparent electrode layers electrically contact each other with a lower resistance applied by the deformable optical layer when a specific portion of the touch panel is touched to generate pressure, the protruded portions having conductivity, and the protruded portions facing each other so as to be contacted with each other when the touch panel is touched, wherein the protruded portions include a first deposition layer formed by a vacuum-deposition process and a second deposition layer deposited on the first deposition layer to have a corn-shape protruding from the first and second transparent films such that the deformable optical layer around the protruded portions is easily moved aside so as to reduce a resistance caused by the deformable optical layer itself.

2. The portable terminal of claim 1, wherein the first refractivity of the first transparent electrode layer is substantially the same as the second refractivity of the second transparent electrode layer.

3. The portable terminal of claim 1, wherein the deformable optical layer is formed of liquid.

4. The portable terminal of claim 1, wherein differences between the first refractivity of the first transparent electrode layer and a refractivity of the deformable optical layer and differences between the second refractivity of the second transparent electrode layer and the refractivity of the deformable optical layer are under 0.5, respectively.

5. The portable terminal of claim 1, wherein the first transparent electrode layer and the second transparent electrode layer are formed of Indium Tin Oxide (ITO) having a refractivity of 2.0; and wherein the deformable optical layer is formed of liquid crystal having a refractivity of 1.6.

6. The portable terminal of claim 1, further comprising a sealant between the first and second transparent films, the sealant providing a perimeter to seal the deformable optical layer between the first transparent film and the second transparent film.

7. The portable terminal of claim 6, further comprising an adhesive member formed adjacent an edge of the sealant to maintain the gap between the first transparent film and the second transparent film.

8. The portable terminal of claim 6, wherein the sealant is formed by a seal printing process.

9. The portable terminal of claim 1, further comprising an anti-reflection coating layer formed on at least one of an upper surface and a lower surface of the touch panel.

10. The portable terminal of claim 1, further comprising a protective layer formed at the upper surface of the second transparent film.

11. A portable terminal comprising:
a display;
a touch panel including:
a first transparent film having an upper surface and a lower surface;
a first transparent electrode layer disposed at the upper surface of the first transparent film;

a second transparent film having an upper surface and a lower surface, the second transparent film being spaced from the first transparent film to provide a gap therebetween;
a second transparent electrode layer disposed at the lower surface of the second transparent film;
a deformable optical layer having a refractivity higher than that of air, filling the gap completely between the first transparent film and the second transparent film, and contacting the first and second transparent electrode layers; and
protruded portions formed at the first transparent electrode layer and the second transparent electrode layer, respectively, such that the first and second transparent electrode layers electrically contact each other with a lower resistance applied by the deformable optical layer when a specific portion of the touch panel is touched to generate pressure, the protruded portions having conductivity, and the protruded portions facing each other so as to be contacted with each other when the touch panel is touched,
wherein the protruded portions include a first deposition layer formed by a vacuum-deposition process and a second deposition layer deposited on the first deposition layer to have a corn-shape protruding from the first and second transparent films such that the deformable optical layer around the protruded portions is easily moved aside so as to reduce a resistance caused by the deformable optical layer itself; and
an adhesive layer disposed between the display and the touch panel.

12. The portable terminal of claim 11, further comprising a terminal body having a front surface, the display being located in the terminal body, and the touch panel being mounted adjacent the front surface.

13. The portable terminal of claim 12, further comprising a damping member disposed between a lower surface of the display and an inner surface of the terminal body.

14. The portable terminal of claim 12, wherein the damping member is directly attached to the terminal body.

15. The portable terminal of claim 14, wherein the damping member is an elastic adhesive layer.

16. The portable terminal of claim 12, wherein the terminal body includes:
a wall encompassing the display; and
at least one guide groove formed at the wall, the at least one guide groove configured to guide the display during displacement of the display towards and away from the front surface.

17. The portable terminal of claim 16, wherein the display includes at least one guide projection located at an edge of the display, the at least one guide projection being receivable in the at least one guide groove.

18. The portable terminal of claim 16, wherein the terminal body includes:
a wall defining an exterior of the terminal body, the wall having an inner surface and an outer surface; and
a stopper formed on the inner surface of the terminal body to limit displacement of the display during displacement of the display away from the front surface.

19. The portable terminal of claim 12, further comprising a shield member disposed between the touch panel and the terminal body, the shield member being configured to cover a clearance between the touch panel and the terminal body.

20. The portable terminal of claim 19, wherein the shield member is formed of one of rubber and plastic.

21. The portable terminal of claim 11, further comprising a glass member disposed below the touch panel, the glass member having a transparent shield pattern.

22. The portable terminal of claim 11, wherein the first transparent electrode layer has a first refractivity, the second transparent electrode layer has a second refractivity, and the deformable optical layer has a third refractivity that is different from the first and second refractivities.

* * * * *